(12) United States Patent
Portolan et al.

(10) Patent No.: US 9,046,071 B2
(45) Date of Patent: Jun. 2, 2015

(54) APPARATUS FOR GENERATING ELECTRICITY

(75) Inventors: Glauco Portolan, New South Wales (AU); Greg Mullane, New South Wales (AU); Elton Harman Button, New South Wales (AU)

(73) Assignee: Portlane Technologies Pty Ltd, Stanwell Tops, New South Wales (AU)

( * ) Notice: Subject to any disclaimer, the term of this patent is extended or adjusted under 35 U.S.C. 154(b) by 0 days.

(21) Appl. No.: 14/001,274

(22) PCT Filed: Feb. 24, 2012

(86) PCT No.: PCT/AU2012/000180
§ 371 (c)(1),
(2), (4) Date: Aug. 23, 2013

(87) PCT Pub. No.: WO2012/113031
PCT Pub. Date: Aug. 30, 2012

(65) Prior Publication Data
US 2013/0328315 A1    Dec. 12, 2013

Related U.S. Application Data

(60) Provisional application No. 61/452,460, filed on Mar. 14, 2011, provisional application No. 61/487,487, filed on May 18, 2011.

(30) Foreign Application Priority Data

Feb. 24, 2011  (AU) .............................. 2011900659

(51) Int. Cl.
*F03B 13/00* (2006.01)
*H02P 9/04* (2006.01)
(Continued)

(52) U.S. Cl.
CPC .............. *F03B 13/10* (2013.01); *F03B 17/061* (2013.01); *F05B 2220/602* (2013.01);
(Continued)

(58) Field of Classification Search
CPC ..... F03B 13/10; F03B 17/061; H02K 7/1823; H02K 7/083; H02K 1/278; H02K 21/16; F05B 2220/602; Y02E 10/22; Y02E 10/28; Y02B 10/50
USPC ................................................. 290/43, 54, 52
See application file for complete search history.

(56) References Cited

U.S. PATENT DOCUMENTS 4,740,711 A * 4/1988 Sato et al. ........................ 290/52
5,043,592 A * 8/1991 Hochstrasser .................. 290/52
(Continued)

FOREIGN PATENT DOCUMENTS

CN    101469662    7/2009

OTHER PUBLICATIONS

International Search Report, PCT/AU2012/00018, May 18, 2012.
(Continued)

*Primary Examiner* — Javid Nasri
(74) *Attorney, Agent, or Firm* — Michael Best & Friedrich LLP

(57) ABSTRACT

An apparatus for generating electricity from mains water is comprises a shaft and a rotor supported on the shaft. The rotor is rotatable in the apparatus as mains water flows through the apparatus. The apparatus also comprises spaced bearings for supporting the shaft. A stator is electromagnetically coupled to the rotor such that, as the rotor is rotated by the mains water flowing through the apparatus, it causes the stator to generate electricity.

32 Claims, 15 Drawing Sheets

(51) Int. Cl.
*F03B 13/10* (2006.01)
*F03B 17/06* (2006.01)
*H02K 7/08* (2006.01)
*H02K 7/18* (2006.01)
*H02K 1/27* (2006.01)
*H02K 21/16* (2006.01)

(52) U.S. Cl.
CPC ............... *H02K 1/278* (2013.01); *H02K 7/083* (2013.01); *H02K 7/1823* (2013.01); *H02K 21/16* (2013.01); *Y02B 10/50* (2013.01); *Y02E 10/28* (2013.01); *Y02E 10/22* (2013.01)

(56) References Cited

U.S. PATENT DOCUMENTS

| | | | |
|---|---|---|---|
| 6,011,334 A * | 1/2000 | Roland | 310/86 |
| 6,798,080 B1 | 9/2004 | Baarman et al. | |
| 6,848,503 B2 * | 2/2005 | Schultz et al. | 166/66.5 |
| 6,957,947 B2 | 10/2005 | Williams | |
| 7,368,828 B1 * | 5/2008 | Calhoon | 290/55 |
| 7,385,303 B2 * | 6/2008 | Roos | 290/54 |
| 7,518,259 B2 | 4/2009 | Leijon et al. | |
| 7,723,860 B2 * | 5/2010 | Nagler | 290/54 |
| 8,022,567 B2 * | 9/2011 | Davis et al. | 290/54 |
| 8,421,258 B2 * | 4/2013 | Pozivil et al. | 290/52 |
| 8,536,719 B2 * | 9/2013 | Holstein et al. | 290/43 |
| 8,786,120 B2 * | 7/2014 | da Silva | 290/52 |
| 2003/0178855 A1 * | 9/2003 | Li | 290/43 |

OTHER PUBLICATIONS

International Report on Patentability, PCT/AU2012/00018, Apr. 4, 2013.

* cited by examiner

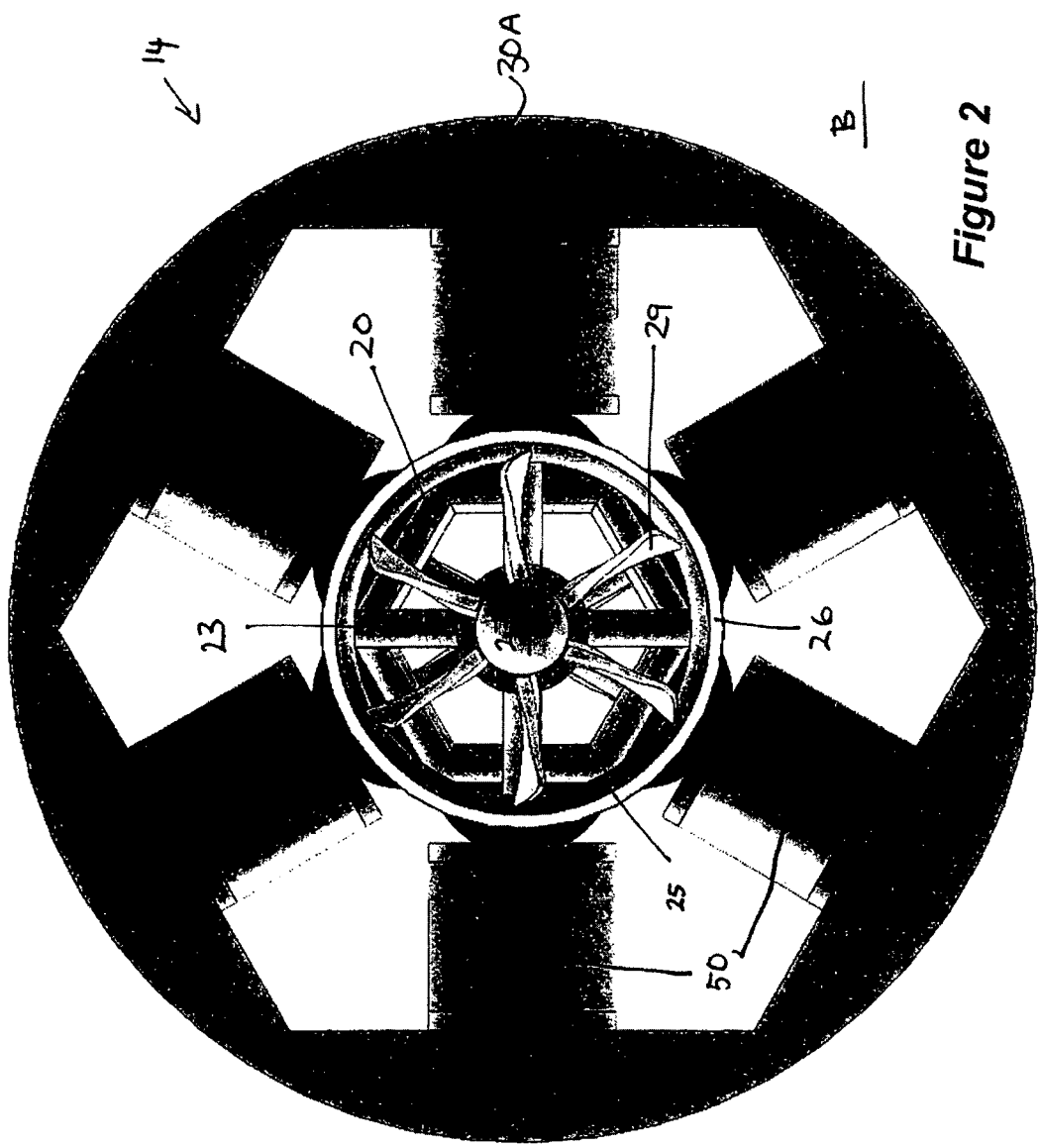

Each blade has opposing magnetic ends. The rectifier board acts to switch on and off the field windings and excited magnet

APPARATUS FOR GENERATING ELECTRICITY

TECHNICAL FIELD

An apparatus is disclosed for generating electricity from mains water. The apparatus will primarily be described in relation to the generation of electricity from municipal mains water used in domestic, commercial and industrial applications, but it should be appreciated that the source of mains water is not so limited, and may take various forms, or be from private sources, or include water from dams, water pumped between reservoirs, etc. Thus, the term "mains water" should be interpreted broadly.

BACKGROUND ART

Water turbines that take energy from moving water have been known since ancient times. Water turbine designs have been improved over the centuries to maximise the amount of energy harvested from the moving water. The developments to maximise harvested energy apply to both reaction and impulse turbines.

CN101469662 discloses an apparatus that can be arranged in-line with a mains water pipe to capture water energy via a turbine. The disclosed apparatus has a single bearing and a rotor spaced in a cantilever manner from the bearing. However, such an arrangement would not be feasible, in practice, as the water would impart excessive force on the rotor and this would be unevenly transferred to the bearing, leading to failure over time. This would be exacerbated in the case of water shunting within the pipe.

The above references to the background art do not constitute an admission that the art forms a part of the common general knowledge of a person of ordinary skill in the art. The above references are also not intended to limit the application of the apparatus, system and method as disclosed herein.

SUMMARY OF THE DISCLOSURE

In a first aspect there is disclosed herein apparatus for generating electricity from mains water. The apparatus comprises a shaft. The apparatus also comprises a rotor supported on the shaft and rotatable in the apparatus as mains water flows through the apparatus. The apparatus also comprises spaced bearings for supporting the shaft. A stator is electromagnetically coupled to the rotor such that, as the rotor is rotated by the mains water flowing through the apparatus, it causes the stator to generate electricity. The rotor may be radially mounted on the rotatable shaft. By providing spaced bearings to support the shaft and rotor, the apparatus is better able to absorb torsional, lateral, shunting, shear and otherwise uneven forces imparted to the rotor and shaft by mains water flowing through the apparatus.

The apparatus is designed for harvesting at least some of the pressure energy in municipal mains water to generate electricity. Often municipal mains water is provided with excess pressure (i.e. to compensate for leaks, peak demand, long feed distances to remote facilities, etc). The energy associated with this excess pressure is often dispersed within the facility, or is dispersed by deploying a water pressure regulator prior to passing the water to the facility.

In one embodiment, the bearings can be located to support the shaft on either side of the rotor. This can provide even support to the rotor and can further minimise stresses placed on the shaft and rotor. The bearings can be of any form, and may preferably be a plain, mechanical or hydrostatic bearing.

In one embodiment, the shaft may be rotatable on the bearings. The rotor may also be supported on the shaft to rotate therewith. The rotor may alternatively rotate on or about a fixed shaft that is supported on spaced bearings. In such an embodiment, the rotor would comprise additional (i.e. its own) bearings.

In one embodiment a leading impeller may be located on, and rotatable with, the shaft such that mains water flowing through the apparatus will contact the leading impeller prior to contacting the rotor. The water contacting the leading impeller causes the shaft to rotate, and may thus cause the rotor to rotate (e.g. when it is fixed to the shaft). The impeller may have an increased surface area to increase the rotational speed of the shaft and rotor, and thus increase the amount of energy harvested.

In one embodiment, the leading impeller is located in the apparatus either before or after a leading bearing. In this regard, the spaced bearings may be positioned in the apparatus such that both the impeller and rotor are positioned therebetween, or a bearing may be positioned between a leading impeller and the rotor.

In one embodiment, the leading bearing is configured to direct water flow onto the leading impeller that is located after the leading bearing. The bearing may have water flow passages therethough to allow the water to flow onto the impeller, thus causing the impeller to rotate. Further, the water flow passages may be angled to change the direction of water flow through the apparatus (e.g. to better direct the water on to the leading impellor).

In another embodiment, a trailing impeller may be located on, and rotatable with, the shaft such that the mains water flowing through the apparatus will contact the trailing impellor after contacting the rotor. The trailing impeller is able to harvest further energy from the mains water after it has passed through the leading impeller and rotor.

Where both leading and trailing impellors are employed, the forces that the apparatus, and more specifically the rotor, are subjected to may be balanced, minimising vibrational stresses on the apparatus. For example, the impellors can be evenly spaced and evenly supported on either side of the rotor and may be located at respective ends of the shaft. The impellors may be of a disc, blade, vane, scoop or paddle type, depending on the intended implementation of the apparatus. For example, where a reaction-type turbine is used, a blade or paddle impellor may be employed, whereas if an impulse-type turbine is used, a scoop that assists with altering the tangential flow direction of the mains water may be more appropriate. Where a disc-type impellor is used, the disc may be a solid disc having one or more bores for water flow therethrough. The bore(s) may be angled such that, when water flows therethrough, the disc rotates.

In the apparatus of the first aspect, the electromagnetic coupling of the rotor to the stator avoids the use altogether of a mechanical coupling. Thus, the apparatus can generate electricity by way of magnetic flux induced in the stator, with the lines of flux extending through a wall located adjacent to the rotor. The spaced bearings stabilize the apparatus and minimize vibrations therethrough, making the apparatus more robust and reliable (i.e. providing it with a longer life, and requiring less maintenance, better electromagnetic coupling, etc).

Thus, the rotor is able to be mounted and sealed internally of a housing, and the housing may then be connected in line with a mains water pipe or with a branch pipe of the mains water pipe.

Alternatively, it is possible for the rotor to be mounted directly within a mains water pipe itself. In this regard, the "housing" for the rotor becomes the wall of the pipe. This can virtually (or may entirely) eliminate any seals associated with the apparatus. Thus, the terminology "rotor housing" as employed herein should be interpreted broadly, to also include a wall of the mains water pipe, or a to-be-spliced-in section of pipe, etc.

The bearings can each be mountingly supported within, and fixed against rotation with respect to, the rotor housing. Mechanical or hydrostatic bearings may be employed, for example, the mechanical bearings may comprise sealed ball or roller bearings that surround and support the shaft. A fixed component of the bearing can also be mounted internally of the rotor housing to extend transversely within the housing. Where a disc or plate-type bearing is used, it may extend transversely within the housing. The disc may have a bore through its centre for supporting the shaft. In this embodiment, this eliminates the need for additional bearing housings for e.g. the mechanical or hydrostatic bearings.

The apparatus of the first aspect can be seen as a generator of electromotive force (EMF). In a primary sense, this generator can accelerate and therefore amplify the voltage output, making the generator more efficient.

The apparatus can also be designed to function as a flow and/or pressure regulator. This may eliminate the need for a separate water pressure regulator, as the apparatus can act as both a pressure regulator and an electricity generator. In this regard, the site and end-use requirements of the rotor can influence whether an impulse-type or reaction-type (or even a hybrid) rotor design is employed.

In an impulse-type turbine, the rotor changes the direction of flow of the fluid (e.g. water). The resulting impulse rotates the turbine and leaves the fluid flow with reduced kinetic energy. In contrast to a reaction turbine, in an impulse turbine there is no pressure change of the fluid. The rotor and rotor housing of the present apparatus may be designed to function like an impulse turbine. For example, the water can enter a circular or elliptical chamber defined within the housing in a tangential flow direction via an inlet, and can exit the chamber in a different tangential flow direction via one or more outlets.

In a reaction-type turbine, a pressure-resistant housing is employed to contain the fluid (e.g. water), and torque is developed as the rotor reacts to the fluid's pressure or mass, whereby the pressure of the fluid changes as it passes through the rotor. The rotor and rotor housing of the present apparatus may alternatively be designed to function like a reaction turbine. For example, the water can be fed directly from the mains water pipe to (i.e. against) the rotor and then directly back into the pipe.

Typically, though not exclusively, for smaller diameter mains water pipes (e.g. domestic branch pipes), an impulse-type turbine set-up can be employed, and for larger diameter mains water (including dam, waterfall, etc) pipes, a reaction-type turbine set-up can be employed. In either case, the apparatus may be arranged "in-line" with the mains water pipe.

The rotor may be configured to not necessarily maximise the energy harvested from the mains water and thus the electricity generated. The rotor set-up may be designed whereby electricity is generated at the same time that the mains water flow and/or pressure across the rotor is controlled (e.g. to drop or be maintained within acceptable or desirable levels). The apparatus can thus simultaneously function as an electricity generator and a water flow and/or pressure regulator. The set-up employed can be tailored to the site and end user's requirements.

The stator is typically located in use on the outside of the rotor housing. For example, when viewed in profile, the rotor housing can surround the rotor, and the stator and its housing can be located to extend right around (i.e. to surround) the rotor housing profile. The stator housing can be fixedly mounted to or be integrated with the rotor housing, so that a contained unit can be supplied for "splicing" into the pipe.

The rotor can take a number of forms. For example, the rotor may take the form of a bladed or paddled turbine-type rotor. Alternatively, it may be disc- or wheel-shaped, with water flow channels extending therethrough, and with the disc rotating on a central axis. When the rotor is used to control/regulate water flow and pressure through the apparatus, or if the apparatus is used in reverse (i.e. electricity supplied thereto so that the apparatus becomes a water pump), then the rotor can alternatively be considered as an impeller. The term "rotor" should thus be interpreted broadly.

In any case, one or more magnets can be provided on or at the rotor. Each magnet can comprise a permanent magnet, or be of a magnetisable material that is able to be excited electrically by an associated electrical current supplied thereto. The electric current for the magnet may e.g. be generated by a "mini" generator that is built into the rotor (i.e. that generates electricity just for the magnets as the rotor is rotated by the mains water). The magnets may be located at and spaced around a periphery of the rotor.

The rotor may comprise a number of spaced elements that each extend radially from a central part of the rotor. A magnet may be associated with at least one of the elements at a periphery thereof. Alternatively, when the rotor takes the form of a disc or wheel, one or more discrete magnets can be spaced and/or extend around the disc or wheel adjacent to a periphery thereof. The rotor may comprise spokes, webs, or water-activatable blades or vanes which define one or more water flow passages therethrough. When the magnet is of a magnetisable material, the electric current may be provided to the magnetisable material via a conductor extending along or through the respective element or disc/wheel of the rotor.

In one embodiment of the stator, wire windings (e.g. coiled wire windings of an electrically conductive material, such as copper) can be provided around a magnetisable element (e.g. armature) located within the stator. Thus, as the rotor is rotated by the mains water, the magnet(s) can induce a magnetic flux within the magnetisable element. This, in turn, induces an electrical current within the wire windings to thereby generate electricity. The magnetisable element (e.g. armature) can itself comprise a rod (e.g. of mild steel), or may comprise multiple (e.g. multiple spiral-wound) wires, bars, rod, etc (e.g. of mild steel). The magnetisable element can take the form of a single loop extending around the rotor.

To maximise the electricity generated, when the rotor comprises a number of spaced magnets incorporated into the rotor. Where the rotor is a disc or wheel, a number of magnets may be provided. The magnet polarity, with adjacent magnets, may alternate (or be changeable). To further maximise the electricity generated, a set of wire windings may be provided within the stator for each magnet.

In this embodiment, when the magnetisable element is in the form of an armature, the armature can extend through each set of wire windings. Further, opposing ends of each set of wire windings can be electrically connected to a rectifier. The armature(s), wire windings sets, and rectifier may all be located in a stator housing that is mounted to surround the rotor housing (e.g. when the apparatus is supplied as a unit). Further, the rectifier can be connected directly or indirectly to the electricity grid or to a smart meter.

Usually the apparatus produces electricity with an alternating current, although it is possible for the apparatus to be configured to produce direct current electricity.

When a reaction-type set-up is employed, the rotor can be arranged to extend transversely across the flow of mains water (e.g. transversely across a chamber of the rotor housing). In this regard, the mains water can be fed via a chamber inlet to directly impact at a front face of the rotor, and to exit a chamber outlet from a rear face of the rotor. In this embodiment the chamber can have a cylindrical form, such that mains water leaving the mains water pipe feeds (flows) directly into the chamber to impact directly at a front face of the rotor and exits (flows from) the chamber from a rear face of the rotor.

In a reaction set-up the impellor and/or rotor elements can be oriented (shaped, angled, spaced, etc) so that the mains water entering the apparatus contacts the blades in a direction that minimises the pressure drop whilst maximising harvested energy. In an impulse set-up the impellor and/or rotor blades can be oriented to face front-on the mains water entering the apparatus to maximise harvested energy and preserve mains water pressure.

In one embodiment, the apparatus may further comprise spaced apart end plates which are fixed apart and tied together by a plurality of tie rods extending longitudinally between the end plates. The shaft, rotor and bearings can be mounted between the end plates. This set-up can provide additional structural integrity to the apparatus.

In a further embodiment, the stator may be configured for decoupling from its electromagnetic coupling with the rotor. The stator may, for example, be configured for lateral displacement with respect to the rotor (e.g. in a slide-mounting arrangement). For example, the stator and its housing may be slidable along a portion of the rotor housing to allow decoupling. It may be preferable that the stator be movable away from the rotor when the water flow is initiated, or in low water flow conditions. When there is a low flow of water, there is a low rotation of the rotor. When the stator is aligned with (i.e. to electromagnetically couple to) the rotor, the electromagnetic coupling can cause an impedance to the rotor's ability to rotate. Removing the electromagnetic coupling allows the rotor to rotate more easily, and the load on the rotor to increase without hindrance. The stator can then be slid back into alignment with the rotor when it is suitable for electricity generation. Alternatively, the stator may only be slightly movable, to allow automatic readjustment of the rotor/stator electromagnetic coupling.

In one embodiment, the shaft may comprise a main shaft portion for supporting the rotor and which may be supported by the bearings. The apparatus may optionally comprise fore and aft shaft portions for respectively supporting and connecting leading and trailing impellors to the main shaft portion.

In a second aspect there is disclosed an apparatus for generating electricity from mains water. The apparatus of the second aspect comprises a rotatable shaft and first and second impellors located on the shaft and arranged to cause the shaft to rotate as mains water flows through the apparatus. The second apparatus also has a rotor associated with the shaft and/or one or both impellors, to rotate therewith as mains water flows through the apparatus. A bearing is also provided to support the shaft as it rotates. A stator is also electromagnetically coupled to the rotor such that, as the rotor is rotated by the mains water flowing through the apparatus, it causes the stator to generate electricity. The apparatus of the second aspect differs from the apparatus of the first aspect in that fore and aft impellors are located on, and rotatable with, the shaft.

In one embodiment, the rotor is located on the shaft intermediate the first and second spaced impellors. The rotor may alternatively, or additionally, form part of either, or both, of the first and second spaced impellors.

The bearing, impellors and stator of the second aspect may otherwise be as defined in the first aspect.

A system for generating electricity from mains water is also disclosed. The system comprises a generator for positioning in line with a mains water pipe or mains water branch pipe. The generator comprises the apparatus as defined in the first or second aspects.

The system is designed for harvesting pressure energy from municipal mains water to generate electricity. The system may comprise multiple generators operated in series on a common pipe or operated in parallel on multiple pipes. For example, generators may be operated in series if e.g. an impulse rotor set-up is employed that tends to preserve water pressure.

In use of the disclosed system, a community, neighborhood or a collective (e.g. of buildings, factories, etc) that receive e.g. high mains water pressure might choose to harvest and pool or otherwise collectively utilise the electricity produced.

With the system disclosed, the generated electricity can be passed to a one or more meters (e.g. a smart meter), and/or can be fed directly back into an electricity grid, and/or can be stored (e.g. in a battery bank). For example, the meter can be an electricity metering unit that is associated with a facility that also receives the mains water (e.g. via a mains water branch line). In such case, the meter can be configured to selectively make use of the electricity, either in the facility itself, by storing it or by feeding it back into the electricity grid if not required. In this regard, the smart meter can use the electricity that is being produced by the system on demand in the facility (i.e. at that time) or, if not required at that time, the electricity can be stored (e.g. in batteries) or supplied back to the grid as a credit.

The facility can be a domestic building (e.g. a house or apartment), an industrial or commercial building or location (e.g. a factory, office tower etc), a municipal facility (e.g. a park, garden, golf course, etc), a collective, etc.

A method for generating electricity from mains water that employs the apparatus as defined in the first or second aspect, or that is deployed in a system as defined above, is also disclosed.

The terminology "mains water" as employed throughout this specification is to be interpreted broadly to include water that is pumped, or fed via a head, via piping from e.g. a station (e.g. a main or central station, or an intermediate pumping station, etc) to a location that is remote from the station. As such, the terminology "mains water" can include potable or drinking water, as well as water for industrial use, waste water, sewerage water, grey water, piped water released from dams, etc. The apparatus and system are able to be employed to generate electricity from all such pressurised and/or pumped water sources.

The terminology "mains water pipe" and "branch pipe" (and related uses) that are employed throughout this specification are also to be interpreted broadly. In this regard, in some cases a mains water pipe may comprise a major pipe leading from a dam, reservoir or other water storage system through which water is pumped. Branch pipes may lead off that major pipe which, depending on the frame of reference, may also be referred to as mains water pipes. In addition, a mains water pipe for a street may in fact be a branch pipe off a larger mains pipe for a district. Further, pipes can branch off a street mains water pipe to a facility in which the water is used (that is e.g. residential, commercial, industrial, municipal (such as parks, gardens), etc). In addition, the pipe that branches off the street mains water pipe may have further pipes branching therefrom (e.g. in commercial, industrial, public facilities etc). As such, the terminology "mains water pipe" and "branch pipe" can be interchangeable, and are thus not to be construed in a limiting manner. The apparatus and system are able to be adapted to be employed with any and all such pipes.

BRIEF DESCRIPTION OF THE DRAWINGS

Notwithstanding any other forms which may fall within the scope of the apparatus, system and method as defined in the Summary, specific embodiments will now be described, by way of example only, with reference to the accompanying drawings in which.

DETAILED DESCRIPTION OF SPECIFIC EMBODIMENTS

Prior to describing the various embodiments of the apparatus for generating electricity from mains water, a specific embodiment of the system and method for generating electricity from mains water will be described with reference to FIG. 1.

System and Method for Generating Electricity from Mains Water

Figure 1:
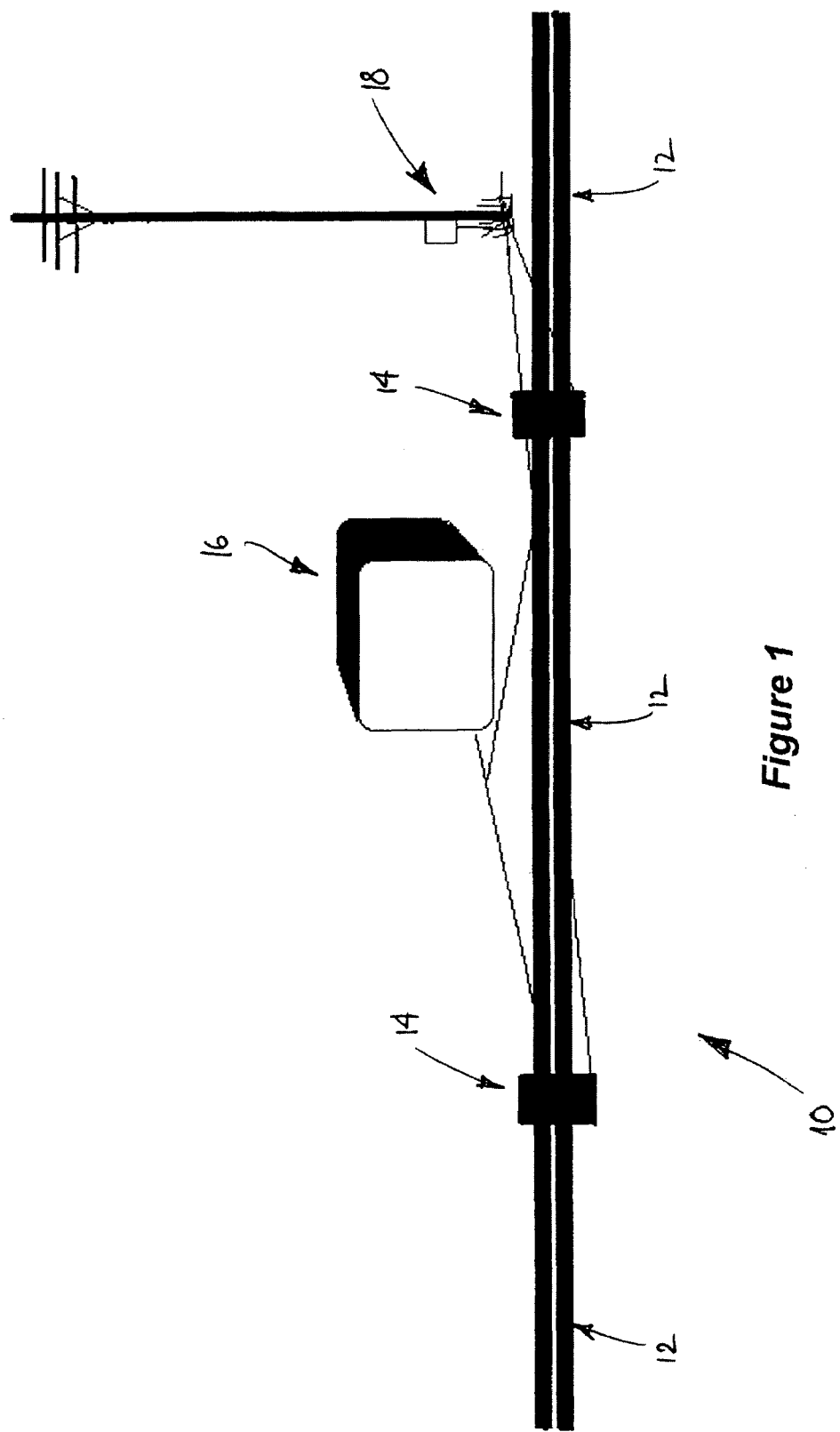
FIG. 1 schematically depicts an embodiment of a system and method for generating electricity from mains water.

In FIG. 1, a system for generating electricity from mains water is schematically depicted by the reference numeral 10. The system 10 receives mains water via e.g. a branch pipe 12 extending from e.g. a mains water network pipe (not shown). In system 10, an apparatus for generating electricity is shown in the form of a generator 14. The generator 14 is connected directly in line into branch pipe 12. In system 10, two such generators 14 are shown in line and in series in the branch pipe 12, though it should be noted that additional generators may be employed, or that the branch pipe 12 may be further branched to feed into two or more generators arranged in parallel.

As explained in greater detail below, the generator 14 comprises a rotor which is actuated (rotated) when the mains water flows through the branch pipe 12 (e.g. as a result of consumption of water in the facility to which the branch pipe flows). A stator housed within the generator 14 is electromagnetically coupled to the rotor. The stator is arranged to produce electricity with an alternating current, whilst the rotor continues to be rotated by the mains water. In the system 10, the electricity generated by the generator 14 can be passed to a meter or battery bank 16 or can be fed back into an electricity grid 18, or can be stored (e.g. in a battery bank—not shown).

Depending on the rotor configuration (impulse or reaction), the mains water flow and/or pressure in pipe 12 will drop to some extent before it flows to the facility, and after the harvesting of energy from the water. Such flow and/or pressure drop may be perfectly acceptable or even desirable, as many municipal mains water supply pressures throughout the world are in excess of that required in a given facility (i.e. to compensate for leaks, peak demand, long feed distances to a remotely located facility, etc). In this regard, mains water supply pressures typically range from e.g. 30 m head up to 100 m head (though may be less or more than this range). Pressures can be especially high in pipelines close to water pumping stations.

The rotor design of generator 14 can be tailored to the site and end user requirements. For example, where the site has surplus mains water pressure, the generator(s) employed can also control or regulate the pressure drop towards a specified minimum, whilst allowing for an optimised energy harvesting and thus electricity output. The generator 14 can thus replace (and also function as) a mains water pressure regulator. If a reaction set-up is employed, and if a low pressure drop across the rotor is required, less energy will be able to be harvested from the mains water. Thus, for some sites, a design may be employed that compromises between the two.

Alternatively, where the site has low mains water pressure, or where flow rate needs to be controlled (or its drop is not critical) an impulse set-up of the rotor may be employed.

In some cases, it may be desirable to reverse the operation of the generator (e.g. by supplying electricity from e.g. the grid or storage to the generator). For example, the generator may be used to slow down water flow therethrough, or may even be configurable to function as a pump. In the latter case, the pump may be used to bolster mains water pressure (e.g. at a site with a low prevailing mains pressure supply).

The facility that makes use of the mains water may be e.g. a domestic building such as a house or apartment, an industrial or commercial building such as a factory, an office tower etc, or a municipal facility such as a park, garden, golf course etc. The generator is configured so that the flow rate and pressure is sufficient (or desirable) for normal use in the facility's appliances, hardware, pipe work, etc.

The meter 16 is typically a "smart" electricity metering unit that is adapted to the system 10. It can be located at the same facility that receives the mains water via the branch pipe 12 or can be located separately. In either case, the smart meter 16 can be configured to selectively make use of the electricity, either in the facility (e.g. directly), or stored for later use, or by feeding it back into the electricity grid 18. For example, the electricity can be supplied to the same appliance (e.g. washing machine, dishwasher, etc) that is making use of the water. The smart meter can sense whether the electricity can be used immediately, or needs to be stored, or if there is surplus and/or if it is a suitable time for it be fed to the grid (e.g. as a credit).

Apparatus for Generating Electricity from Mains Water

Embodiments of apparatus for generating electricity from mains water will now be described and are depicted in FIGS. 2 to 10, with these Figures also detailing various components of that apparatus.

Figure 2:
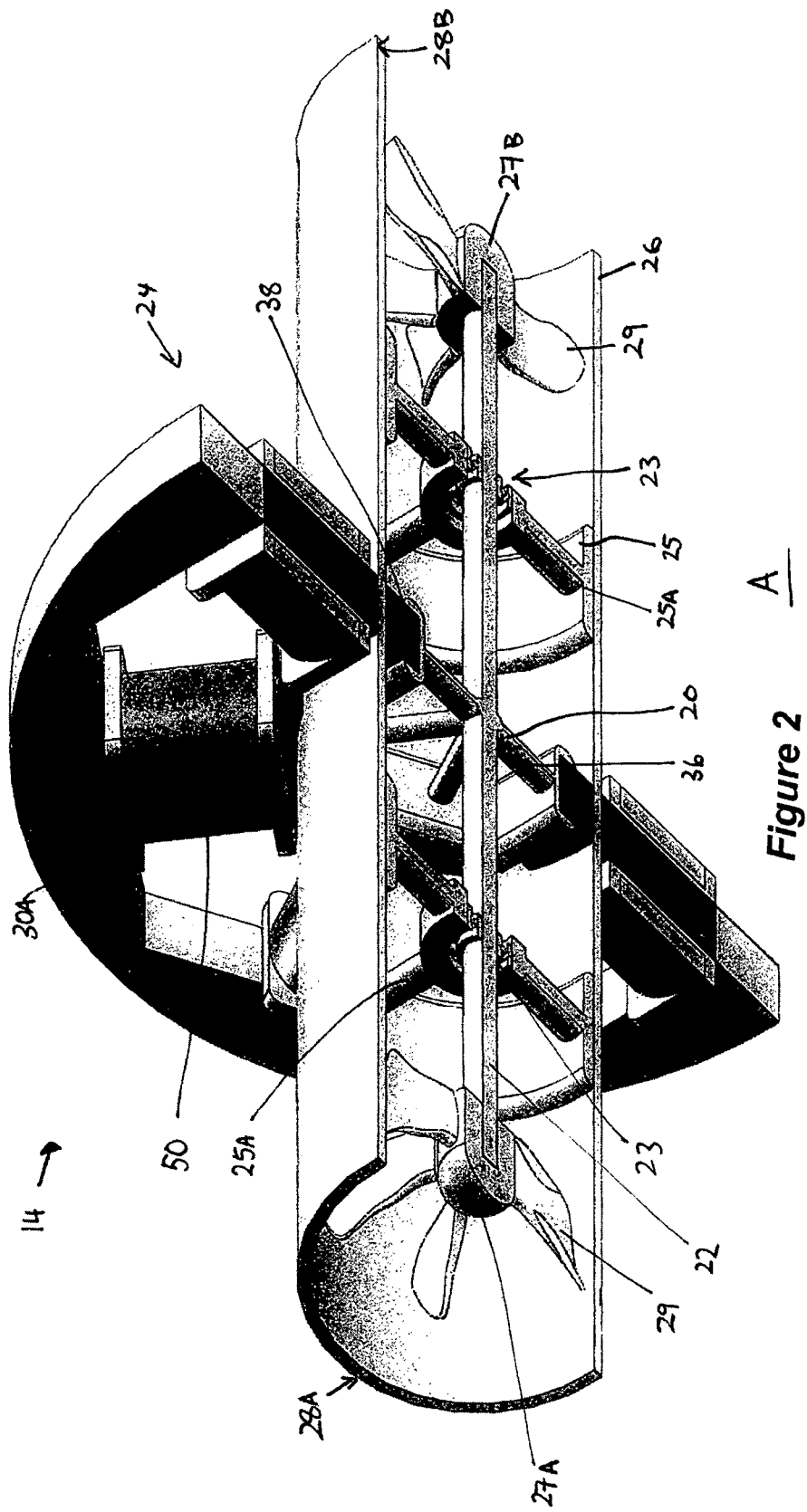
FIGS. 2A to 2C respectively show, in an embodiment of an apparatus for generating electricity from mains water, a cross-sectional perspective view of the apparatus, an end view of the apparatus, and a side (part interior) view of the apparatus.
Figure 2:
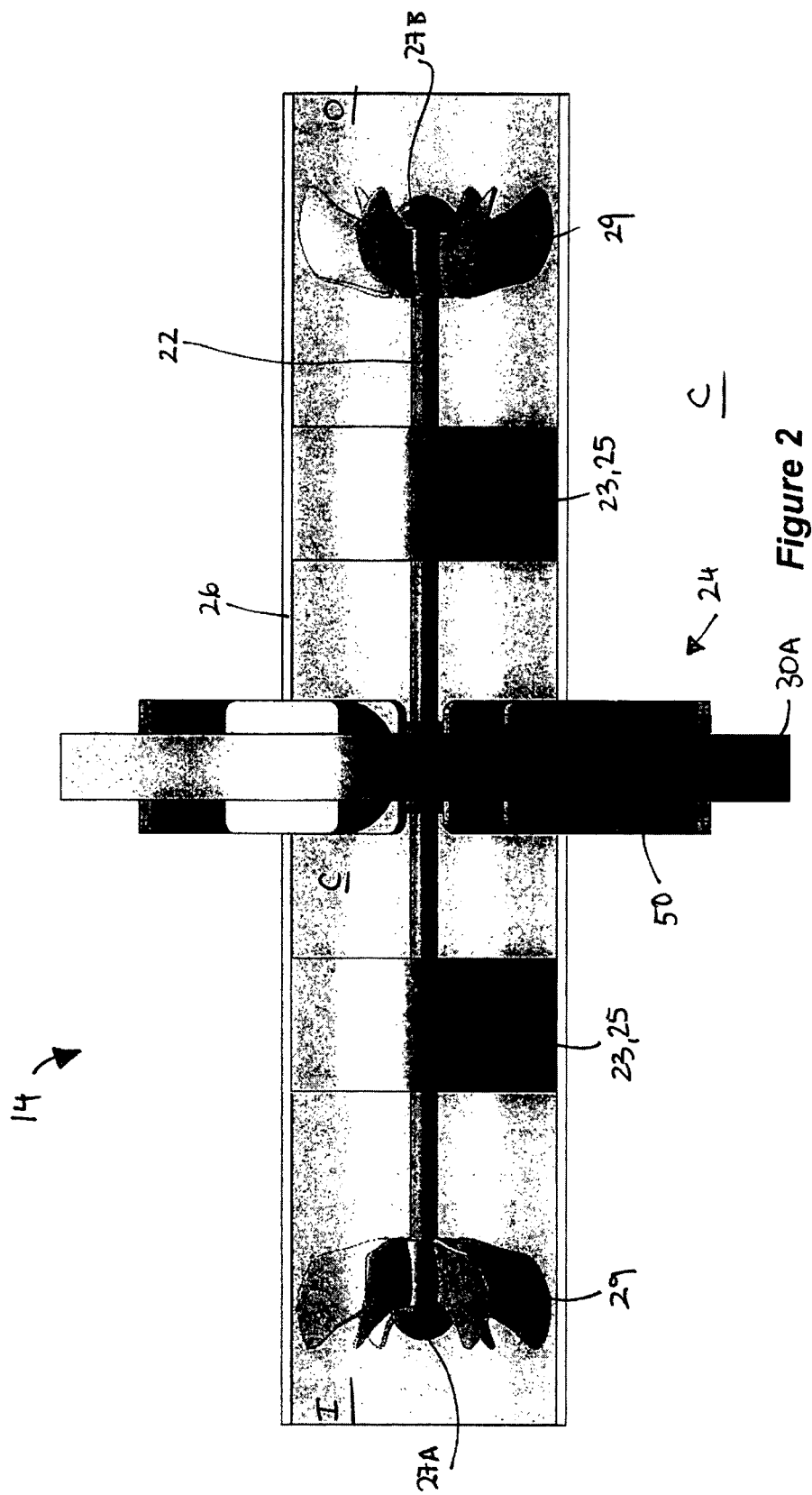

As mentioned above, and now with specific reference to FIGS. 2 to 8, an apparatus for generating electricity from mains water can take the form of a generator 14. The generator 14 comprises a rotor 20 via which the mains water passes to rotate the rotor 20. The generator 14 also comprises a stator 24 that is "coupled" electromagnetically to the rotor 20. Whilst shaft 22 may be of a fixed type, and about which the rotor 20 rotates (e.g. as supported by mechanical or hydrostatic bearings), in the embodiments of FIGS. 2 to 10, the shaft 22 rotates, with its rotation being supported by spaced bearings 23 located on either side of the rotor 20. In FIG. 2, a frame 25 of the bearing, comprising spokes 25A, is fixed to and is located within a housing 26 of the generator 14. In FIGS. 3 to 6, the bearing is a disc or wheel bearing, and the frame forms part of the bearing itself (i.e. the outer portion of the bearing that is fixed to the rotor housing 26). The bearings 23 provide stability and support to the rotor 20 and rotatable shaft 22, and minimise vibrational stresses within the unit. The bearings can be mechanical (e.g. sealed ball or roller bearings) or may be hydrostatic, with the latter being particularly suited to the present mains water applications of the generator. As discussed with respect to FIGS. 4 to 5, the bearings may also be plain bearings, with the shaft 22 rotating in a centre bore of the bearing.

The electromagnetic coupling of the rotor 20 to the stator 24 avoids the use altogether of a mechanical coupling. Electricity is able to be generated from a moving (or fluxing) magnetic field arising from the rotating rotor as it is drivingly rotated by mains water (i.e. as the mains water flows through the generator).

Figure 10:
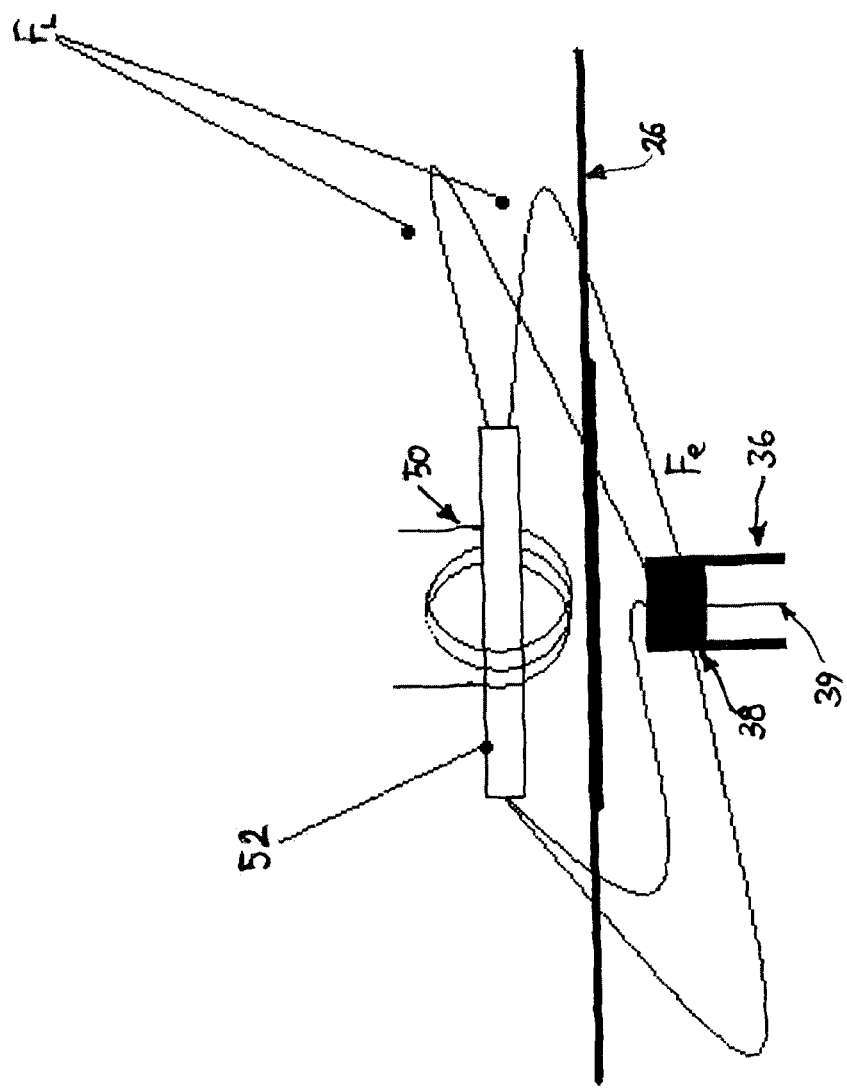
FIG. 10 schematically depicts magnetic flux and magnetic induction when generating electricity using the apparatus of FIGS. 2 to 6.

As illustrated schematically in FIG. 10, the moving magnetic field $F_e$ "flows" through a wall located adjacent to the rotor (which may e.g. be a wall of a rotor housing 26 or a pipe wall). This induces magnetic flux $F_L$ in the stator 24. The only seal that is required is where the rotor housing 26 (or pipe) couples to the mains water pipe 12 (i.e. a seal is only required at the inlet and outlet to the housing or pipe in which the rotor is located).

The generator 14 is thus easily able to be "spliced" in line into a mains water pipe. Also, because the rotor 20 no longer requires mechanical coupling to an externally located generator, it is conceivable that the rotor 20 can be adapted for mounting (i.e. to rotate within) an existing mains water pipe. Alternatively, it may be mounted within a section of pipe that is then able to be spliced into the existing mains water pipe. In this regard, the view of rotor housing 26 in FIGS. 2B and 3D should also be considered to be an end view of a pipe surrounded by a stator.

Figure 3:
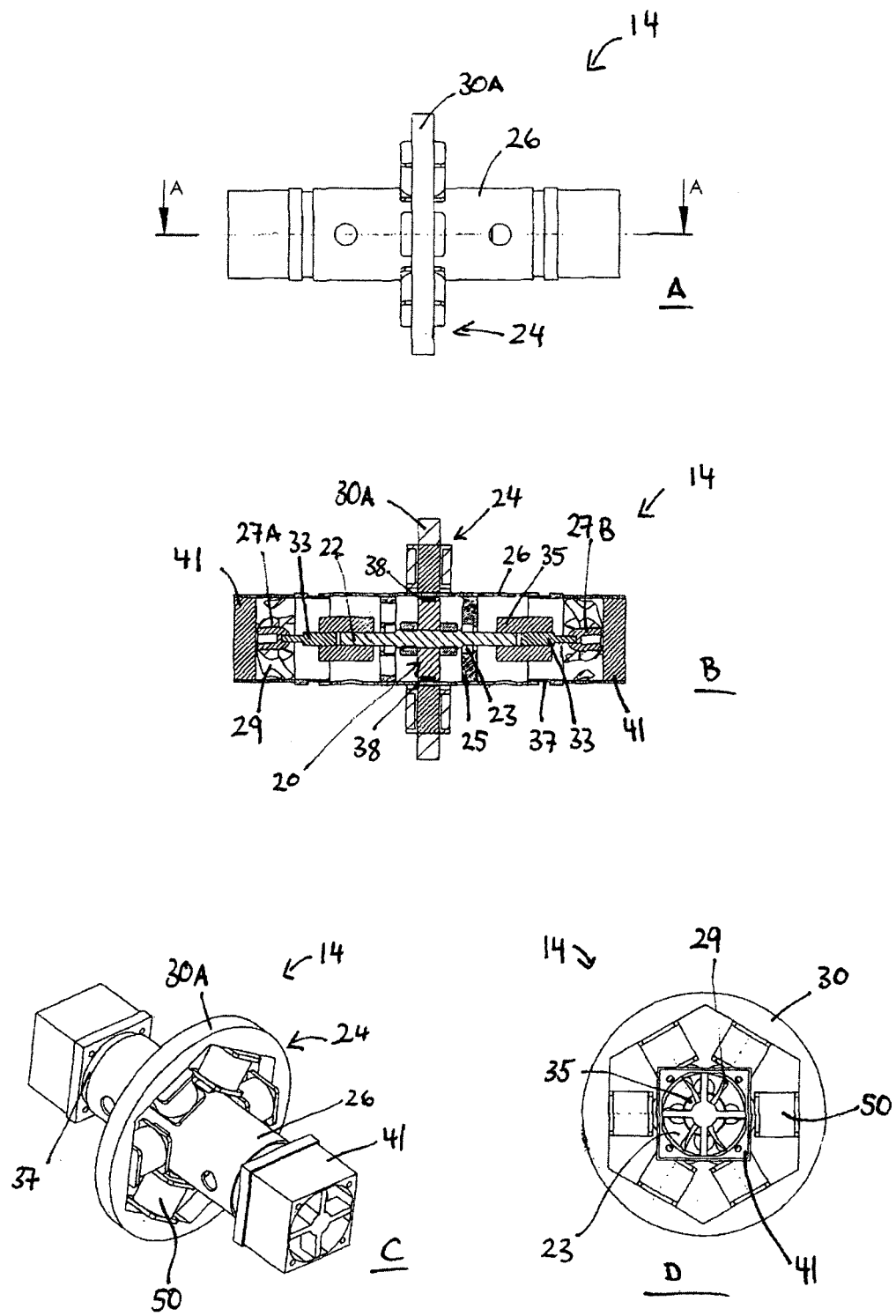
FIGS. 3A to 3E respectively show, in a second apparatus embodiment, a side view of the apparatus, a cross-sectional view of the apparatus, a perspective view, an end view and a cross-sectional perspective view of the apparatus.
Figure 3:
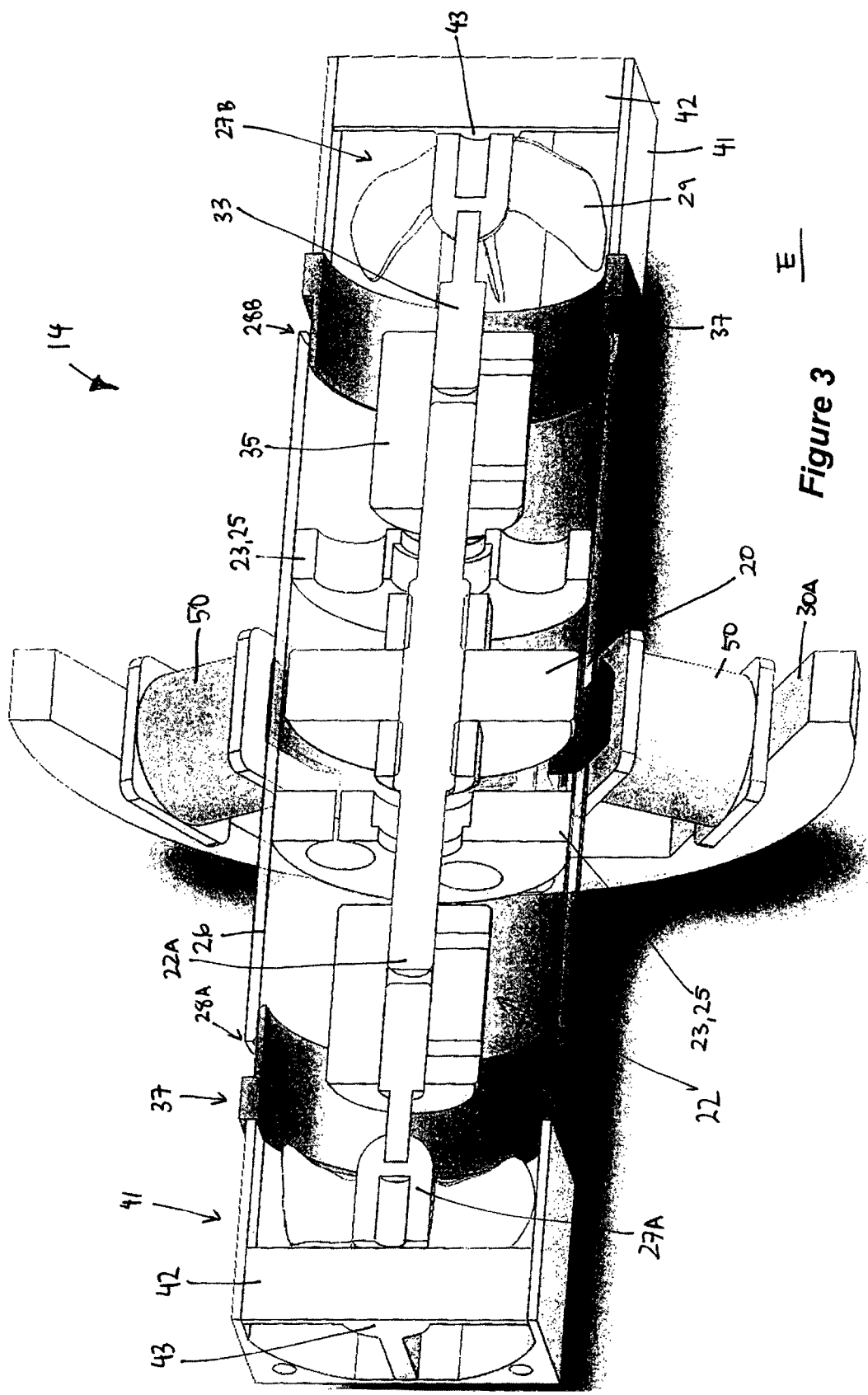

As shown in FIGS. 2 and 3, the generator 14 can also comprise leading and trailing impellors 27A and 27B located (e.g. keyed, screwed, press- or interference- or friction-fitted) on opposite ends of the shaft 22. This is different to the generator embodiments shown in FIGS. 4 and 5, where only a leading impellor is used. This latter configuration is described in more detail, below. Alternatively, the rotor may be an impellor, thus eliminating additional components in the generator.

Each impellor 27A and 27B, as shown in FIGS. 2 and 3, comprises broad, twisted, propeller-like blades 29. When the mains water passes the blades 29, the impellors cause shaft 22 and thus rotor 20 to rotate. The impellors 27A and 27B may act as a single impellor, for example where they are located on the one shaft, or they may act separately, for example where they are located on separate shaft portions. As the rotor 20 is caused to rotate, the stator 24 generates electricity, as explained below. Whilst the stator 24 as shown is configured to produce electricity with an alternating current, it is also possible to configure it to produce direct current. It is also possible to supply electricity to the stator to in turn cause the rotor to rotate, and, thus the impellers 27A and 27B can pump water in the pipe (i.e. generator 14 becomes a pump).

Figure 8:
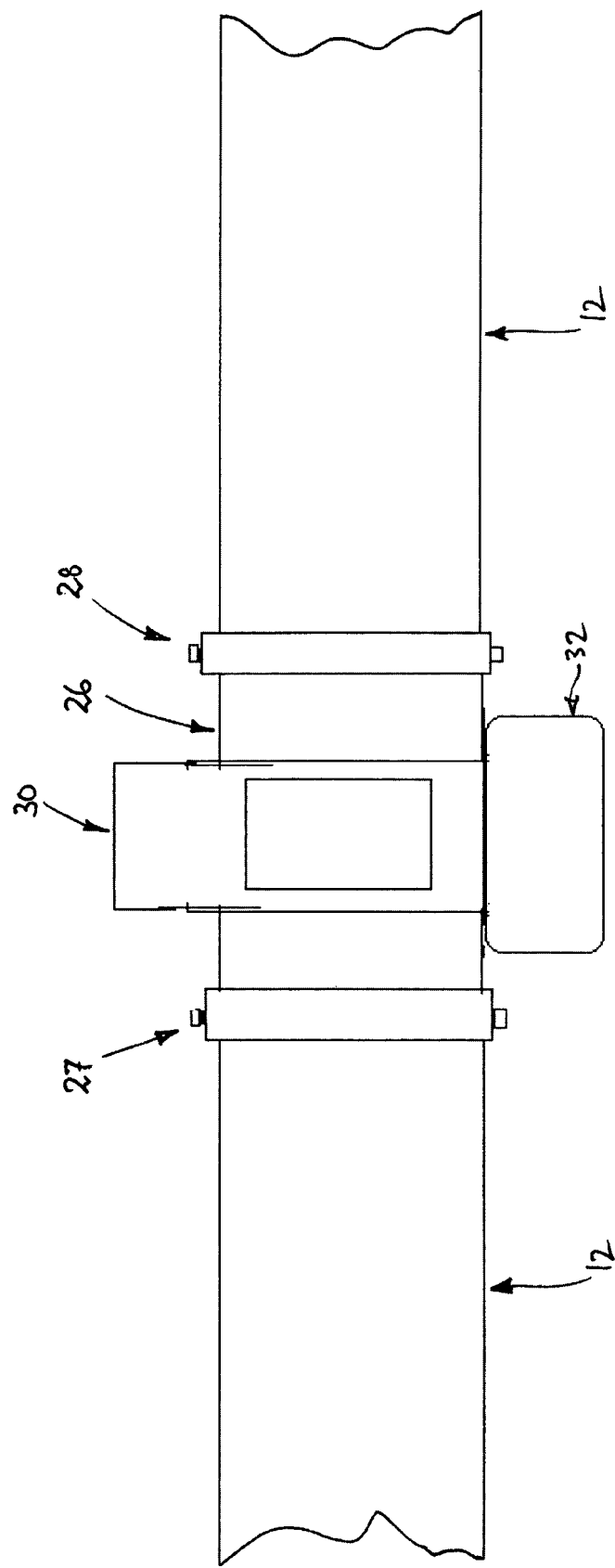
FIG. 8 shows the apparatus of FIG. 2 when coupled in-line to a pipe.
Figure 9:
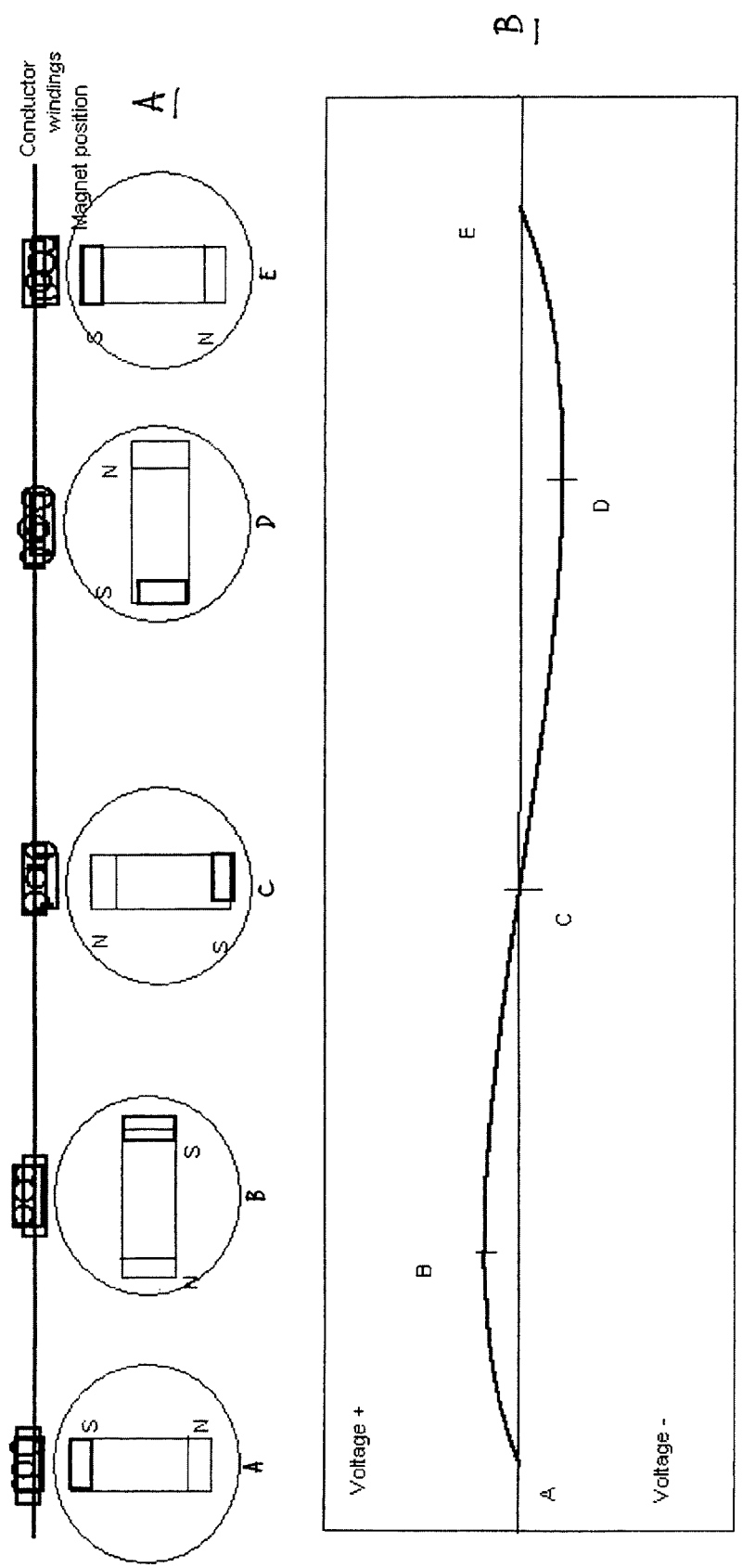
FIGS. 9A and 9B respectively show a schematic of the relative magnet positions and a plot of the resulting voltage generated.

As mentioned above, the generator 14 is arranged in line with the mains water pipe or branch pipe 12 (FIGS. 1 and 8). The pipe 12 thus only needs to be coupled to the housing 26 at inlet and outlet couplings 28A and 28B. Because the generator 14 is arranged in line, the mains water leaving generator 14 can be used as normal in a facility. At the same time, and as outlined above, the generator 14 can also be employed to regulate mains water flow rate and/or pressure drop.

As shown in FIG. 8, the stator 24 is located in its own housing 30, which in use is mounted to the outside of the rotor housing 26. A frame 30A (e.g. an armature) of the stator 24 is supported at an inside surface of the housing 30. As shown in sectional profile in FIGS. 2A, 2B, 3B and 3E, the stator frame 30A surrounds the rotor housing 26, with the stator 24 being configured to locate right around the exterior profile of the rotor housing 26, thereby maximising the electricity generation potential of the generator 14. The stator housing 30 and rotor housing 26 are also mounted to a base-support 32 (shown schematically in FIG. 8) for locating the generator 14 on the ground, providing a stand for the generator, etc. The generator 14 thus takes the form of an entirely self-contained unit that can be supplied for direct splicing into pipe 12.

The rotor 20 may comprise one or more spokes 36 (i.e. six spokes are shown in FIG. 2) mounted to extend radially from the shaft 22. Alternatively, the rotor may take the form of a centrally supported disc or wheel that has flow channels formed therein or therethrough (see FIGS. 3 to 5, and 6E). Other configurations of the rotor are also possible. For example, where no impellors are employed, the spokes 36 may comprise one or more blades that are capable of being water driven. Furthermore, a rotor configuration can be deployed at or adjacent to each of the impellors 27A and 27B.

A magnet 38 is mounted adjacent to or may be incorporated within a remote end of each spoke 36, or at the outer edge of a disc or wheel, to maximise the electricity generated by the apparatus. The polarity of each adjacent magnet 38 can be reversed, e.g. spoke-to-spoke, moving around the rotor, and/or across opposing spoke pairs.

Each magnet 38 comprises a permanent magnet, however, each may be of a magnetisable material that is able to be excited electrically by an associated electric current provided thereto. For example, an electric current may be provided to the magnetisable material via an electrical conductor 39 (see FIG. 6B) that extends along or through a respective spoke or blade of the rotor.

The electric current supplied to the electrical conductor 39 may be generated by a "mini" generator that is built centrally into the rotor 20. Thus, as the rotor 20 rotates, the mini generator can generate electricity solely for the magnets 38. Alternatively, it may make use of a "trickle" of the current generated by the generator.

In FIG. 2, a reaction-type rotor configuration is depicted in which the rotor 20 extends transversely across a chamber C of the rotor housing 26. In this configuration, as shown in FIG. 2C, mains water that is fed into the chamber C via the inlet side I of the chamber C impacts and rotates a front face of the leading impellor 27A and then flows onto a front face of the rotor 20. When the rotor has blades or vanes in place of spokes

36, it can also be rotated by the mains water. The mains water flows from a rear face of the rotor and impacts a front face of the trailing impellor 27B and then exits via an outlet side O of the chamber C.

However, it should be appreciated that the generator 14 can, in effect, be turned on its side and can also be offset from the water flow path to adopt an impulse-type rotor configuration. In this case, the chamber can be reshaped to have a circular or elliptical profile, with the inlet oriented such that water enters the chamber in a tangential direction, and with one or more outlets oriented such that water leaving the chamber exits in a tangential direction. This impulse-type configuration is particularly suitable for smaller diameter (e.g. domestic dwelling) branch pipes, which can be connected in line with the tangentially directed inlet and outlet(s).

In a similar manner to rotor 20, the bearing frame 25 is arranged to extend transversely across the chamber C of housing 26. The frame 25 is mounted within and internally to a wall of the housing 26.

In the reaction set-up as shown, the blades 29 of the impellors 27A and 27B are configured and oriented (i.e. provided with a suitable fluid-dynamic profiling, twist-shaped, angled, spaced, etc) so that the mains water entering the rotor housing 26 contacts the blades 29 in a direction that maximises energy harvested by the blades whilst, at the same time, allowing the water flow rate and/or pressure drop to be controlled (e.g. losses minimised).

In this regard, the impellor blades 29 can be designed whereby their fluid-dynamic profile brings about a predetermined (pre-calculated) drop. Further, the blades 29 can be designed whereby their fluid-dynamic profile is such that the mains water contacts and flows across the blades in a direction and to an extent that tends towards flow rate preservation and pressure drop minimisation, whilst also tending towards a maximal harvested energy. In addition, the blades 29 can be designed to have a known, though optimal, drag.

The number of blades can be optimised to the desired generator performance. Thus, whilst six blades 29 are depicted on each impellor 27A and 27B, this does not imply that this is an optimal number or configuration for all possible applications of the generator.

Referring now to FIG. 3, an alternative generator 14 is shown. This generator is also of the reaction-type rotor configuration, though may be reconfigured to an impulse-type set-up. In this embodiment, the rotor 20 comprises a disc having water flow channels defined therethrough, and is mounted on a rotatable shaft 22, with magnets 38 spaced around the rotor's outer periphery. Two spaced bearings 23 support the shaft 22 on either side of the rotor 20. Bearings 23 have water flow-through channels 23A, a bore 92 for supporting the shaft 22. However, in this embodiment the frame 25 defines a fixed or static part of each bearing 23. The frame 25 can then be mounted (e.g. welded, riveted, etc) to an inside wall of the housing 26. In this embodiment, the leading and trailing impellors 27A and 27B are located on separate short shaft portions 33 which are attached to the ends of shaft portion 22A of shaft 22 via respective shaft clamp couplings 35. This configuration allows just the rotor and bearing parts to be located and mounted in the housing 26. This may simplify manufacture, but also allows standard or an existing pipe to be employed for the housing.

In the embodiment of FIG. 3, a remote or distal end of each impellor 27A, B is supported for rotation in the respective shaft clamp couplings 35, and surrounded by a respective shroud 41. Each shroud 41 is connected to the inlet and outlets 28A and 28B of housing 26 via a respective adapter 37. The mains water inlet and outlet pipes can then be attached to the respective shrouds 41. Each shroud 41 comprises spokes or arms 42 for providing additional integrity to the apparatus. Each shroud may also support a respective impellor, to resist the various shear, torsional, twisting, shunting, etc forces to which it is subjected in use.

Figure 4:
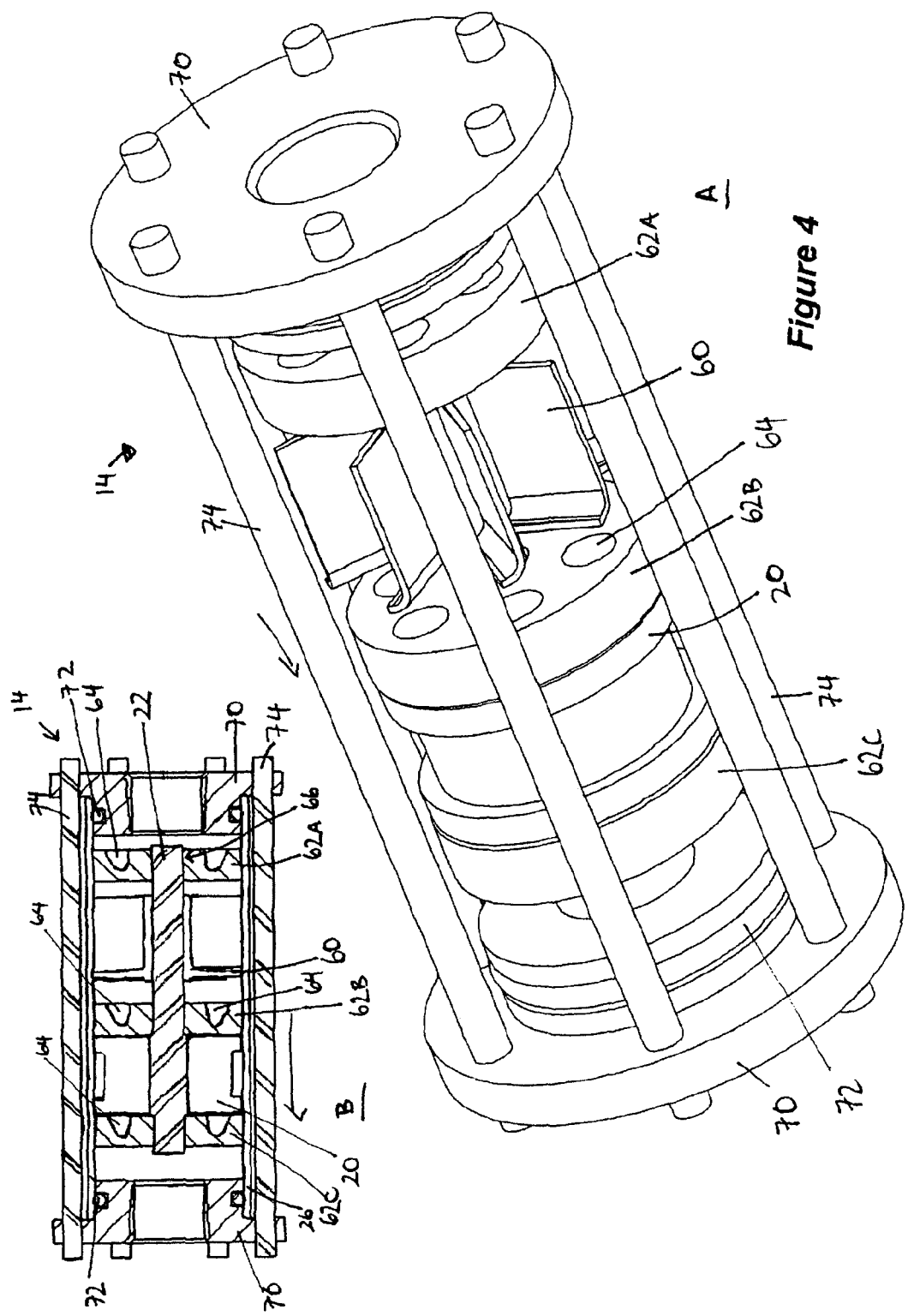
FIGS. 4A and 4B respectively show, in a third apparatus embodiment, a perspective view and a cross-sectional view of the apparatus.

With reference to FIG. 4, a further alternative generator 14 is shown. The direction of water flow through the apparatus is shown by the arrow. This generator is also of the reaction-type rotor configuration, though may be reconfigured to an impulse-type set-up. Similar to FIG. 3, the rotor 20 comprises a disc, having water flow channels defined therethrough, and is mounted on a rotatable shaft 22. In this generator only one, leading, impellor 60 is provided. Impellor 60 is of the blade or vane-type, and is shown mounted to, and rotatable with, shaft 22.

The shaft 22 is shown being supported by three spaced bearings 62A, 62B, 62C. Bearings 62A and 62C are located at respective ends of the shaft 22, and bearing 62B is positioned between the impellor 60 and rotor 20. In this embodiment, the bearings 62 are shown supporting the shaft 22 without the need for additional e.g. ball bearings or bearing housing located therebetween, and thus may be considered as 'plain'-type bearings. The bearings 62 may be made of a polymer, such as nylon, having a bore 66 through which the shaft 22, which may be a metal such as chrome, copper or stainless steel, extends. Shaft 22 can then free-spin in bore 66. Each of the bearings 62A, 62B, 62C takes the form of a disc having water channels 64 therethrough. Whereas in FIG. 3 the water channels are shown having axes parallel to that of the shaft, the water channels 64 are shown, in this embodiment, having an angled (up to approximately 30°) offset. In addition to the increase in water pressure, as the water is forced through the constricted space of the water channels, the direction of water flow is changed by the angled water channels. This assists with the water forcing the impellor 60 to rotate.

Rotor 20 is also shown being of the centrally supported disc-type, with magnets 38 spaced around its outer periphery, and being mounted to shaft 22. In this embodiment, the shaft 22 is shown of unitary construction. The bearings 62, at the bearing frames 68 (i.e. an outer edge of the bearings 62), are fixed to, and located within, a rotor housing 26, in the form of an outer tube or pipe. Two end plates, in the form of connectors 70, are used at opposite ends of housing 26 to enable the apparatus to be "spliced" into a mains water pipe. An O-ring 72 is provided between each connector and the housing 26 to assist with sealing the connector 70 in place. In addition to the housing 26 and connectors 70, a number of tie rods 74 are provided to form a cage around the housing 26, to provide additional structural integrity. The rods 74 extend the length of the housing 26 and through each of the connectors 70, thus fixing the connectors in place.

Figure 5:
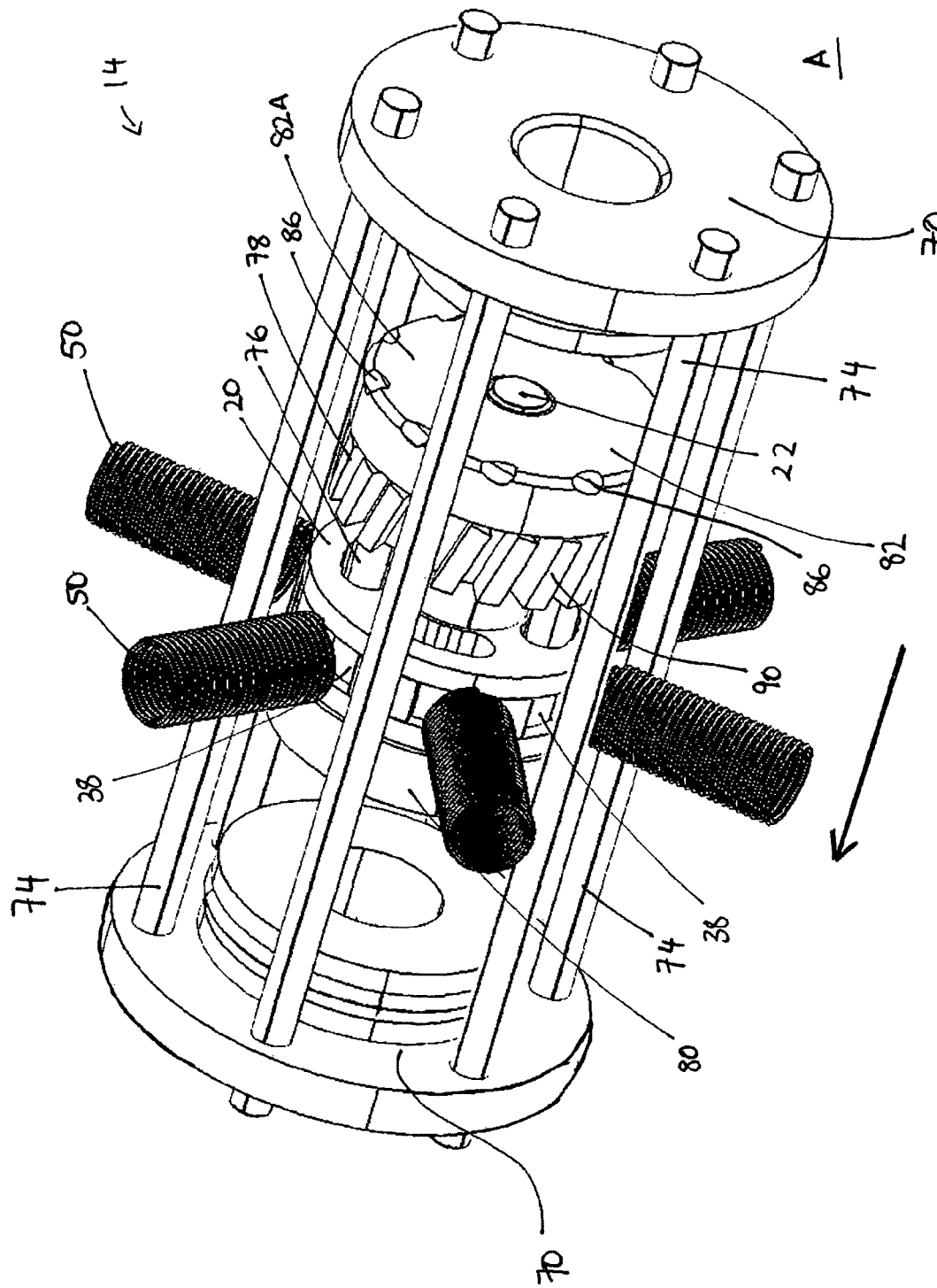
FIGS. 5A to 5D respectively show, in a fourth apparatus embodiment, an assembled perspective view (no housing), a part exploded perspective view (no housing), a part exploded perspective view with housing), and an exploded perspective view of the apparatus.
Figure 5:
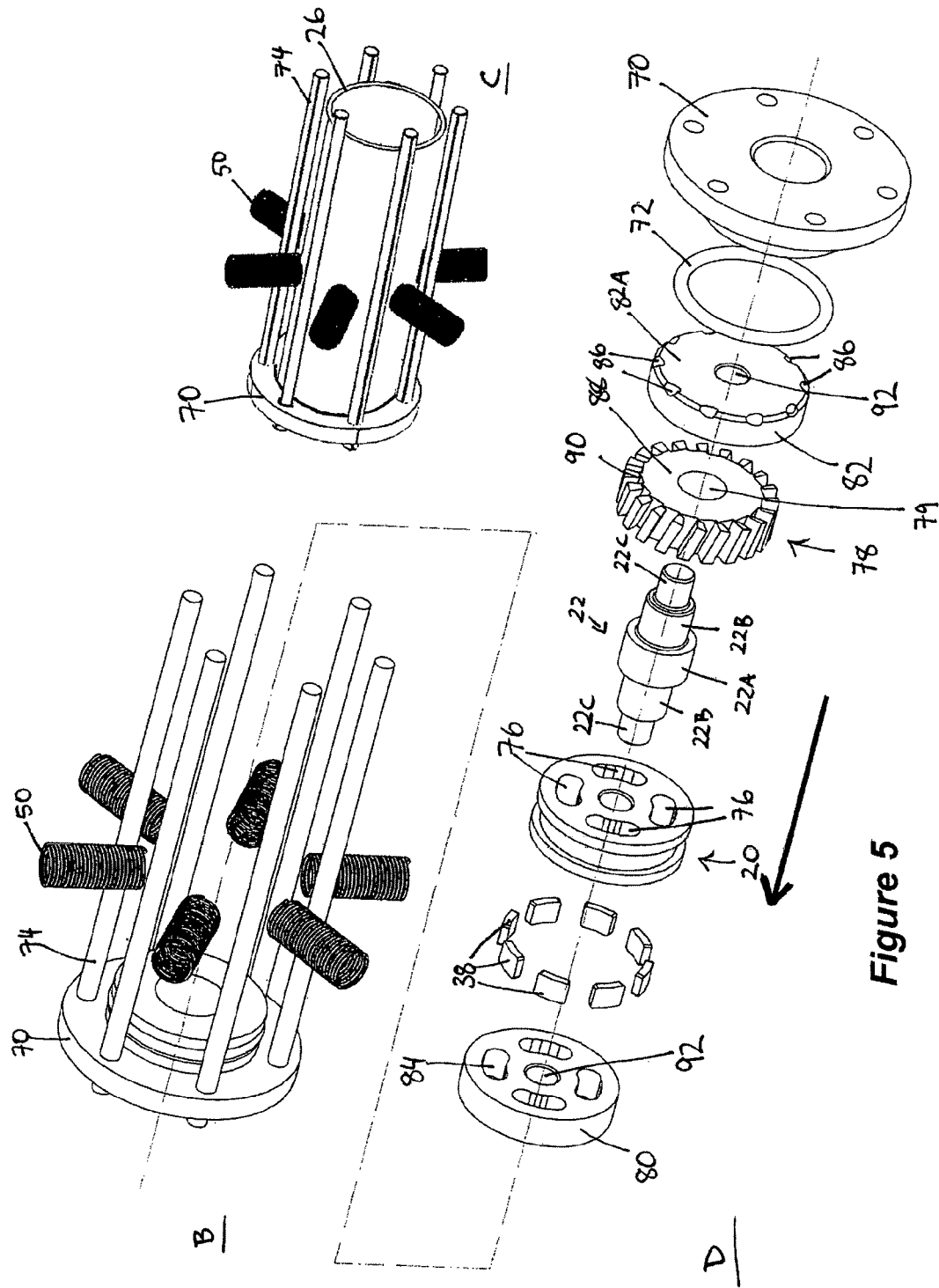
Figure 6:
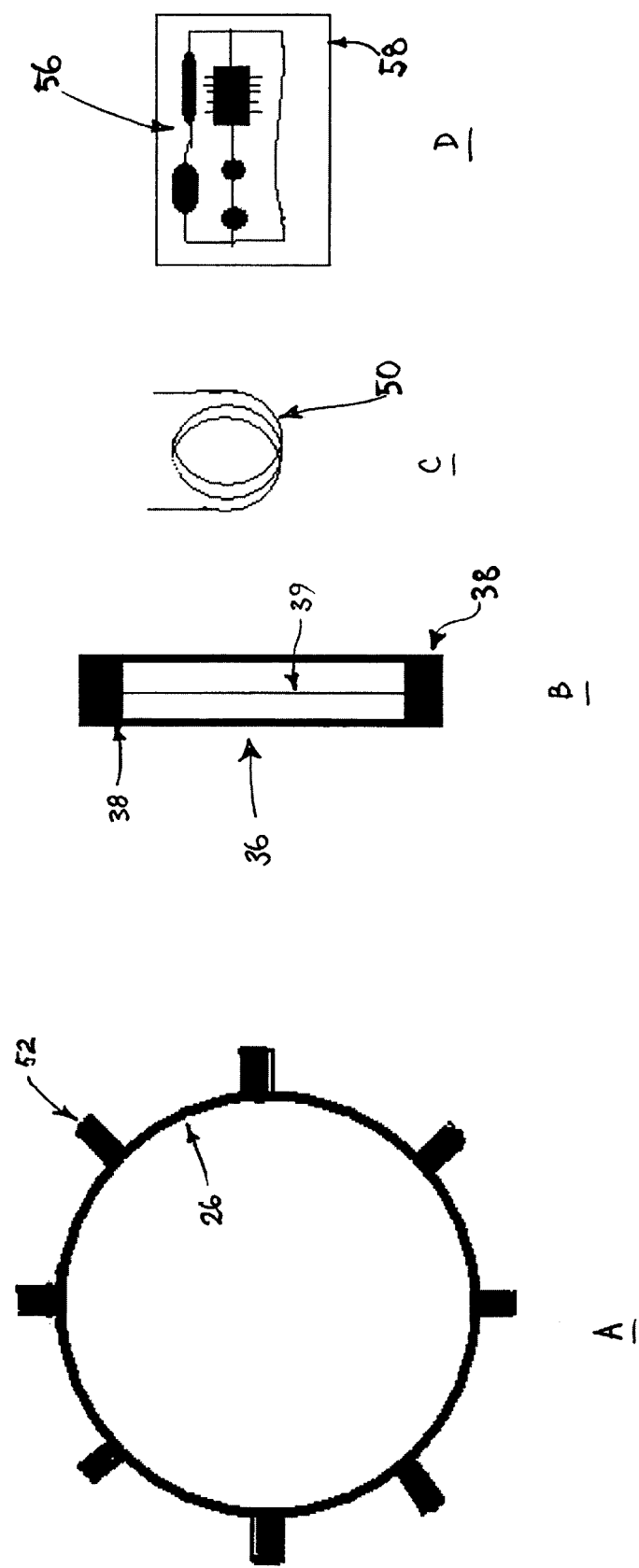
FIGS. 6A to 6I respectively show various components of the apparatus of FIGS. 2 to 5.
Figure 6:
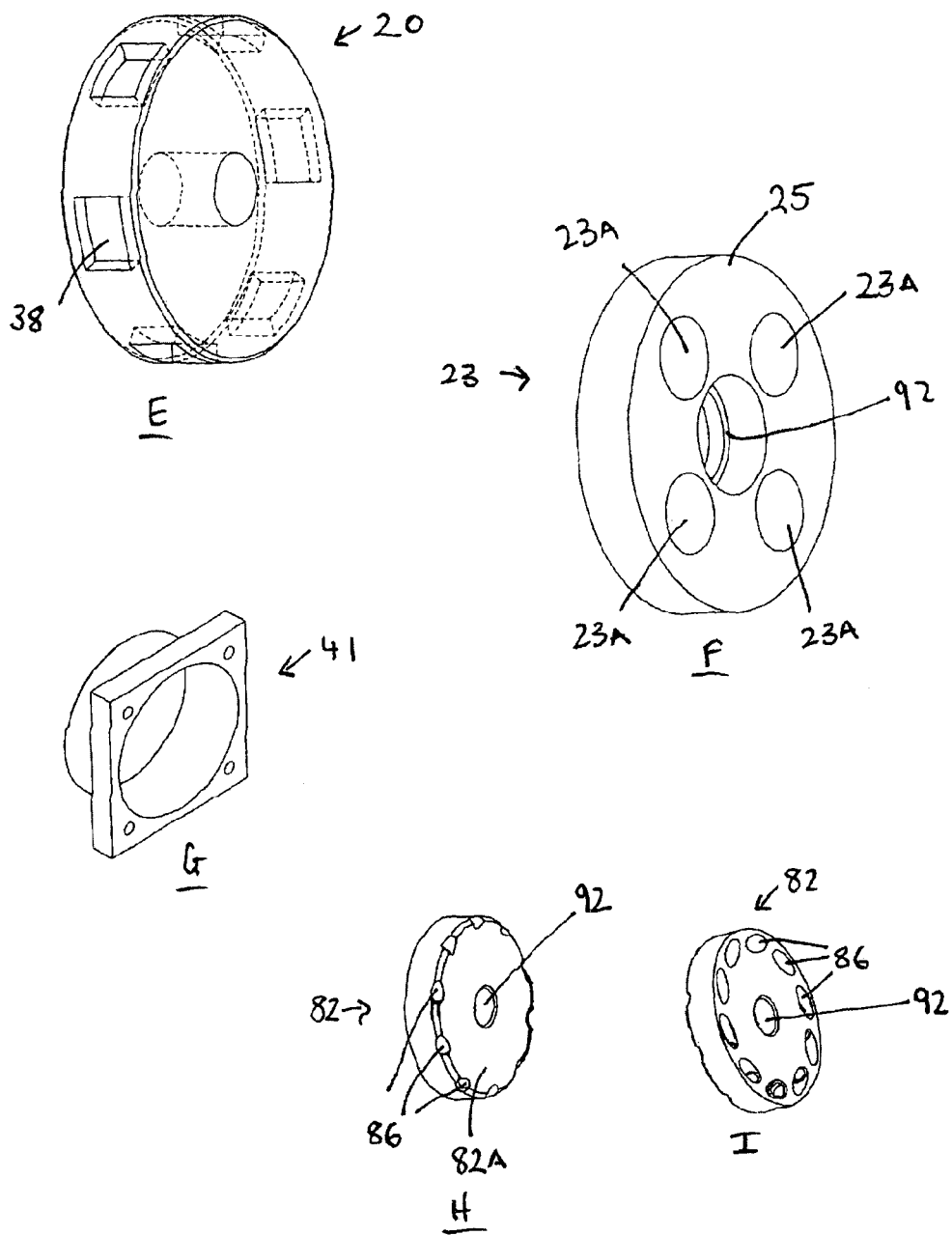
Figure 7:
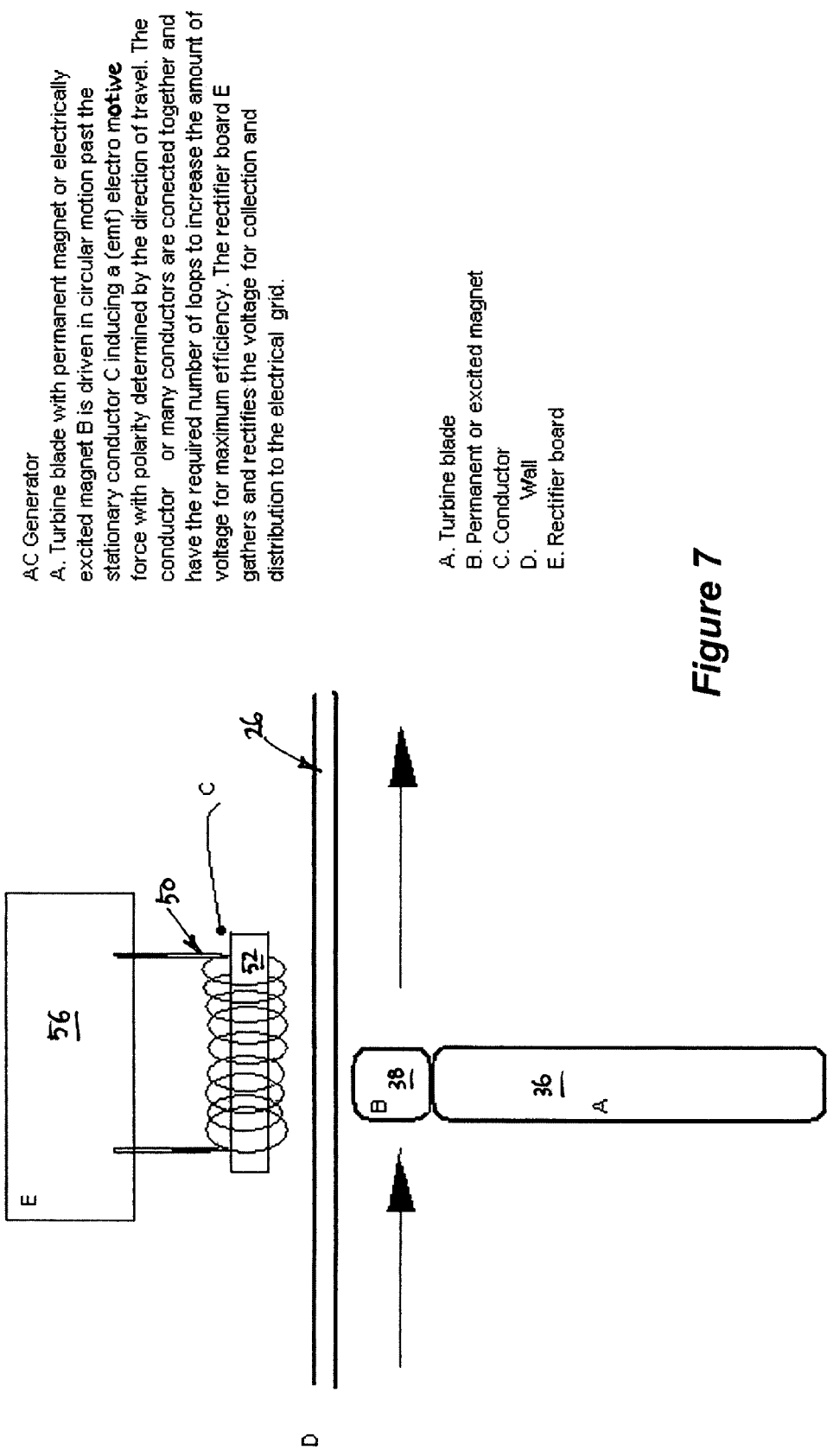
FIG. 7 schematically depicts the generation of electricity using the apparatus of FIGS. 2 to 6.

Referring now to FIG. 5, a further alternative generator 14 is shown. The direction of water flow through the apparatus is shown by the arrow. This generator is also of the reaction-type rotor configuration, though may be reconfigured to an impulse-type set-up. Similarly to FIGS. 3 and 4, FIG. 5 shows the rotor 20 as a disc, having water channels 76 extending therethrough and magnets 38 at a periphery thereof, the rotor being mounted to shaft 22. Shaft 22 is shown being of unitary construction, but with alternating diameters along its length. It would also be possible to provide a shaft having multiple components to form its length (i.e. separate shaft pieces may be used for the various lengths of shaft with different diameter). In this embodiment, the shaft 22 has a central region 22A that has a larger diameter, two mid-regions 22B on either side of the central region 22A that have a mid-sized diameter, and two outer regions 22C (i.e. the shaft ends) that have a smaller diameter. The central region 22A may be used as a spacer to create a space or gap between the rotor 20 and the impellor 78, while the two mid-regions 22B are where the rotor 20 and impellor 78 are mounted to the shaft 22. Impellor 78 is mounted to shaft 22 at bore 79. The outer regions 22C are supported in bearings 80, 82. It should be noted that, in this embodiment, only two bearings are required to provide balanced support to the shaft 22.

Bearing 80 is similar to the bearings 62 shown in FIG. 4, except that the water flow-through channels 84 extend through the bearing on an axis parallel to the shaft axis. Bearing 82, however, is different, and is shown in greater detail in FIGS. 6H and 6I. Bearing 82 has a substantially flat front face 82A that the water impacts. An outer edge of the bearing 82 has a plurality of narrow water flow-through channels 86. While bearing 82 is shown having ten such channels 86, it should be appreciated that the bearing may have additional or fewer such channels. Water channels 86 are angled to direct water onto the impellor 78 to better cause it, and subsequently the shaft 22 and rotor 20, to rotate. Impellor 78 is shown as a disc having a solid central region 88 with blades 90 extending therefrom. Blades 90 are angled to assist with continued rotation and to alter the direction of the water flow as it passes through the rotor 20.

Bearings 80, 82 provide support to shaft 22 without the need for additional bearing housings, and the shaft 22 essentially free-spins in a bore 92 of the bearings 80, 82. Bearings 80, 82 are mounted in a pipe 26 that is similar to the rotor housing shown in FIG. 4. Similarly, connectors 70 are used at opposite ends of the housing, with a number of tie rods 74, to form a cage to provide additional structural integrity to the generator. A number of sets of wire windings 50 of an electrically conductive material are also shown in this embodiment (further detail provided below), although the rest of the stator and stator housing are not depicted, nor is the manner in which the stator housing is mounted to the rotor housing. However, it should be noted that the stator housing may be movable (e.g. laterally shifted in a slide mounting) with respect to the rotor housing, but still mounted thereto.

The stator 24 in each of the embodiments of FIGS. 2 to 6 comprises a number of sets of wire windings 50 of an electrically conductive material, such as coiled copper wire. Each set of windings 50 coils around a magnetisable element in the form of a mild steel armature 30A or 52, located within and extending around the stator 24. The windings 50 are evenly spaced within and around the stator housing 30. To further maximise the electricity generated, a set of wire windings 50 is provided for each magnet 38 provided on the various rotors 20.

The armature 30A or 52 can comprise a rod or bar of mild steel, or may comprise multi-stranded wire, etc. The armature 30A or 52 can take the form of a single loop in the stator 24, or respective loops for one or more sets of the windings 50, etc.

Each set of wire windings 50 is connected via wires 54 to a rectifier 56 mounted on a rectifier board 58 (FIG. 6D) housed within the stator housing 30. The rectifier 56 is adapted to provide electricity of a suitable voltage and so can be connected directly (or indirectly) to the electricity grid 18 or to the smart meter 16.

A controller for the generator can be provided that enables an operator to, for example: switch on and off given respective windings 50; regulate the power offtake; change polarity of or switch off certain of the excited magnets; reverse electricity flow to the generator; etc. The rectifier 56 can form part of the controller. In this way an operator can use the stator 24 to control rotor speed and thus flow rate through and/or pressure drop across the generator 14.

In use, as the rotor 20 is rotated by the mains water, the moving magnets 38 create a fluxing magnetic field, which induces magnetic flux within the armature 52. This, in turn, induces a current/voltage within the wire windings 50, with the out-of-phase current/voltage being rectified via the rectifier 56 to enable the generation of electricity. The generated current/voltage is supplied to the smart meter 16 or fed straight to the grid 18.

FIG. 9A (views A-E) shows the different orientations of the magnets for a given magnet/opposing magnet pair as the rotor 20 rotates in the chamber C. FIG. 9B shows the resulting and corresponding plot of voltage (as generated by the generator 14), with the plot assuming that there is just one opposed magnet pair. The current and potential generated is cumulative, though offset, for multiple magnet pairs (but which is of course rectified by the rectifier in use).

The generator 14 can thus be seen as a generator of electromotive force (EMF). In a primary sense, the generator 14 can accelerate and therefore amplify the voltage output of the generator, making the generator more efficient.

As mentioned above, the rotor 20 is shown in a reaction-type setup such that the mains water pressure drop across the rotor can be controlled/maintained within acceptable/desirable levels. The design employed differs from e.g. a Francis-type reaction turbine (which is configured to maximise energy harvested, resulting in a significant pressure drop across the turbine).

As mentioned above, the rotor 20 is able to be redesigned in an impulse type setup such that the mains water flow rate across the rotor can be controlled/maintained within acceptable/desirable levels.

The rotor 20 is designed to make use of the mains water head, whilst also regulating mains water flow rate and/or exit pressure. Thus, the generator 14 can be effectively used to generate electricity, after which the mains water can suitably be passed on to the facility.

The generator 14 shown in FIGS. 1 to 10 can be arranged in line with large scale mains water pipes (i.e. of a mains network) or can be arranged in line with a branch pipe of the mains water pipe. The generator 14 can be adapted to a wide range of mains water pressures.

Components of the generator and the casings for the rotor and stator housings can be cast, moulded and/or machined from modem materials e.g. carbon fibre, aluminium, plastics, steel, etc.

It should also be understood that the size of the generator will be adapted to the size of the mains/branch pipe with which it is employed.

Whilst a number of specific apparatus, system and method embodiments have been described, it should be appreciated that the apparatus, system and method may be embodied in other forms.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus, system and method as disclosed herein.

The invention claimed is:

1. Apparatus for generating electricity from mains water, the apparatus comprising:
   a shaft;
   a rotor supported on the shaft and rotatable in the apparatus as mains water flows through the apparatus;
   leading and trailing bearings, located on either side of the rotor, for supporting the shaft; and
   a stator that is electromagnetically coupled to the rotor such that, as the rotor is rotated by the mains water flowing through the apparatus, it causes the stator to generate electricity,
   wherein the leading bearing comprises one or more water flow passages that are angled to change the direction of water flow through the apparatus.

2. Apparatus as claimed in claim 1 wherein the shaft is rotatable on the bearings and wherein the rotor is supported on the shaft to rotate therewith.

3. Apparatus as claimed in claim 2 further comprising a leading impellor located on, and rotatable with, the shaft such that mains water flowing through the apparatus will contact the leading impellor prior to contacting the rotor.

4. Apparatus as claimed in claim 3 further comprising a trailing impeller located on, and rotatable with, the shaft such that mains water flowing through the apparatus will contact the trailing impeller after contacting the rotor.

5. Apparatus as claimed in claim 3 wherein the leading impellor is located in the apparatus either before or after the leading bearing.

6. Apparatus as claimed in claim 5 wherein the leading bearing is configured to direct water flow onto the leading impellor that is located after the leading bearing.

7. Apparatus as claimed in claim 3 wherein leading and trailing impellors are located at respective ends of the shaft.

8. Apparatus as claimed in claim 7 wherein the impellor(s) comprise one or more blades, vanes, scoop or paddles.

9. Apparatus as claimed in claim 2 further comprising a trailing impeller located on, and rotatable with, the shaft such that mains water flowing through the apparatus will contact the trailing impeller after contacting the rotor.

10. Apparatus as claimed in claim 1 wherein the rotor is arranged in a housing that is able to be arranged in line with a mains water pipe or with a branch pipe of the mains water pipe, and wherein the stator is located in use on the outside of the housing.

11. Apparatus as claimed in claim 10 wherein each of the bearings is mountingly supported within and is fixed against rotation with respect to the rotor housing.

12. Apparatus as claimed in claim 11 wherein a fixed component of the bearing is mounted internally of the rotor housing to extend transversely within the housing.

13. Apparatus as claimed in claim 10 wherein, in profile, the housing surrounds the rotor, and wherein the stator is located right around the profile of the housing.

14. Apparatus as claimed in claim 1 wherein one or more magnets are provided on or at the rotor, and wherein wire windings are provided around a magnetisable element located within the stator whereby, as the rotor is rotated by the mains water, the magnet(s) induce a magnetic flux within the magnetisable element to in turn induce an electrical current within the wire windings to generate electricity.

15. Apparatus as claimed in claim 14 wherein magnets are located at and spaced around a periphery of the rotor.

16. Apparatus as claimed in claim 14 comprising sets of wire windings, wherein a magnetisable element in the form of an armature extends through each set of wire windings, and wherein opposing ends of each set of wire windings are electrically connected to a rectifier.

17. Apparatus as claimed in claim 16 wherein the armature(s), wire windings sets, and rectifier are all located in a stator housing that is mounted to surround the rotor housing, and wherein the rectifier is connected directly or indirectly to the electricity grid or to a smart meter.

18. Apparatus as claimed in claim 14 wherein each magnet is permanent, or is of a magnetisable material that is able to be excited electrically by an associated electrical current provided thereto.

19. Apparatus as claimed in claim 18 wherein the associated electrical current is provided to the magnetisable material via a conductor extending along or the rotor.

20. Apparatus as claimed in claim 1 wherein the rotor extends transversely across the flow of mains water, with the mains water being fed via an apparatus inlet to directly impact at a front face of the rotor, and exiting an outlet of the apparatus after flowing from a rear face of the rotor.

21. Apparatus as claimed in claim 1 further comprising spaced apart end plates which are fixed apart and tied together by a plurality of tie rods extending longitudinally between the end plates, wherein the shaft, rotor and bearings are mounted between the end plates.

22. Apparatus as claimed in claim 1 that produces electricity with an alternating current.

23. Apparatus as claimed in claim 1 wherein the stator is configured for decoupling from its electromagnetic coupling with the rotor.

24. Apparatus as claimed in claim 23 wherein the stator is configured for lateral displacement with respect to the rotor.

25. Apparatus as claimed in claim 1 the rotor comprises spokes, webs, or water-activatable blades or vanes which define one or more water flow passages through the rotor.

26. Apparatus for generating electricity from mains water, the apparatus comprising:
   a rotatable shaft;
   first and second spaced impellors located on the shaft and arranged to cause the shaft to rotate as mains water flows through the apparatus;
   a rotor, said rotor forming part of one of the said impellors to rotate therewith as mains water flows through the apparatus;
   a bearing to support the shaft as it rotates; and
   a stator that is electromagnetically coupled to the rotor such that, as the rotor rotates, it causes the stator to generate electricity.

27. Apparatus as claimed in claim 26 wherein the bearing comprises spaced leading and trailing bearings, located on either side of the rotor, for supporting the shaft, the leading bearing comprising one or more water flow passages that are angled to change the direction of water flow through the apparatuses.

28. Apparatus as claimed in claim 26 wherein the first and second spaced impellers comprise:
   a leading impeller located on, and rotatable with, the shaft such that mains water flowing through the apparatus will contact the leading impellor prior to contacting the rotor; and
   a trailing impellers located on and rotatable with, the shaft such that mains water flowing through the apparatus will contact the trailing impellor after contacting the rotor.

29. Apparatus as claimed in claim 26 wherein the rotor:
   forms part of both of the said spaced impellors.

30. Apparatus as claimed in claim 29 wherein the rotor further comprises a shaft rotor, located on the shaft intermediate the first and second spaced impellors.

31. Apparatus as claimed in claim 26 wherein the rotor further comprises a shaft rotor, located on the shaft intermediate the first and second spaced impellors.

32. Apparatus for generating electricity form mains water, the apparatus comprising:
- a rotatable shaft;
- first and second spaced impellors located on the shaft and arranged to cause the shaft to rotate as mains water flows through the apparatus;
- a rotor associated with the shaft to rotate therewith as mains water flows through the apparatus;
- a bearing to support the shaft as it rotates; and
- a stator that is electromagnetically coupled to the rotor such that, as the rotor rotates, it causes the stator to generate electricity;
- wherein the bearing comprises spaces leading and trailing bearings, located on either side of the rotor, for supporting the shaft, the leading bearing comprising one or more water flow passages that are angled to change the direction of water flow through the apparatus.

* * * * *